(12) United States Patent
Synnott

(10) Patent No.: US 6,916,154 B2
(45) Date of Patent: Jul. 12, 2005

(54) DIAMETRICALLY ENERGIZED PISTON RING

(75) Inventor: Remy Synnott, Varennes (CA)

(73) Assignee: Pratt & Whitney Canada Corp., Quebec (CA)

(*) Notice: Subject to any disclaimer, the term of this patent is extended or adjusted under 35 U.S.C. 154(b) by 155 days.

(21) Appl. No.: 10/424,811

(22) Filed: Apr. 29, 2003

(65) Prior Publication Data
US 2004/0219014 A1 Nov. 4, 2004

(51) Int. Cl.⁷ ............................................. F01D 1/02
(52) U.S. Cl. ............................. 415/208.2; 415/209.1; 415/209.2
(58) Field of Search ........................... 415/208.1, 208.2, 415/209.1, 209.2

(56) References Cited
U.S. PATENT DOCUMENTS

| | | | |
|---|---|---|---|
| 5,129,783 A | * | 7/1992 | Hayton ..................... 415/209.3 |
| 5,269,651 A | * | 12/1993 | Ostermeir et al. ........ 415/209.1 |
| 5,302,085 A | | 4/1994 | Dietz et al. |
| 5,369,882 A | | 12/1994 | Dietz et al. |
| 5,380,154 A | * | 1/1995 | Norton et al. ............ 415/209.2 |
| 5,462,403 A | * | 10/1995 | Pannone ................... 415/173.1 |
| 5,487,642 A | * | 1/1996 | Norton et al. ............ 415/209.2 |
| 5,520,514 A | | 5/1996 | Mareix et al. |
| 5,599,170 A | | 2/1997 | Marchi et al. |
| 5,700,133 A | | 12/1997 | Surdi |
| 6,062,813 A | | 5/2000 | Halliwell et al. |

* cited by examiner

*Primary Examiner*—Hoang Nguyen
(74) *Attorney, Agent, or Firm*—Ogilvy Renault LLP

(57) ABSTRACT

A resilient ring for sealing between an inner housing surface of revolution and a coaxial outer housing surface of revolution, one of the housing surfaces being a sloped surface with a sloped profile intersecting an axially extending plane and the other housing surface being an axial abutment surface in a substantially radially extending plane. The ring has a circumferential sealing surface for sealing engagement of the ring with the sloped housing surface, and a planar abutment surface for sealing engagement of the ring with the axial abutment housing surface.

15 Claims, 5 Drawing Sheets

DIAMETRICALLY ENERGIZED PISTON RING

TECHNICAL FIELD

The invention relates to use of a single diametrically energized ring to seal between an axially sloped housing surface and an axial abutment housing surface, particularly in the assembly of a gas turbine engine.

BACKGROUND OF THE ART

A piston ring assembly is used in assembling together components of the gas turbine engine usually where there is a pressure differential between the sealed components or the pressure differential alternates.

It will be understood that the invention relates to sealing of any housing components with a pressure differential while accommodating relative axial movement and simultaneous radial movement between the two components.

For example, in gas turbine engines that are assembled of numerous coaxial housings and components that require sealing between them, axial and radial motion occurs due to thermal expansion and contraction and due to resilient movement under pressure differential. An example is the conventional sealing between a turbine support case and a vane ring outer shroud. Conventionally, (as shown in FIG. 2 and discussed further below) a sealing ring has a generally triangular cross-section and is used to seal against two orthogonal surfaces sealing both axially and radially. A second inner ring acts as a resilient energizer to apply a resilient biasing force exerted against the triangular sealing ring to maintain the seal. The tension or compression in the energizing ring expands or contracts to wedge between the vane ring and the conical surface of the triangular ring thereby forcing the triangular ring against the axial mating surface and the radial surface in a sealing engagement. The turbine support case generally has a cylindrical sealing surface and the vane ring includes a circumferential groove with axial sealing surface and an axial abutment face against which the energizing ring reacts.

A disadvantage of this conventional arrangement is the requirement to manufacture and assemble two rings in order to accommodate the assembly tolerances, thermal expansion and contraction, as well as displacements caused by any pressure differential. Sealing rings of this type are often replaced during engine overhauls and since the rings are often made from castings to provide better creep properties, the cost of replacing such rings is significant.

It is an object of the invention to provide a low cost piston ring sealing arrangement that can be utilized for newly constructed engines or as a retrofit during regular engine maintenance.

Further objects of the invention will be apparent from review of the disclosure, drawings and description of the invention below.

DISCLOSURE OF THE INVENTION

The invention provides a resilient ring and method for sealing between an inner housing surface of revolution and a coaxial outer housing surface of revolution, one of the housing surfaces being a sloped surface with a sloped profile intersecting an axially extending plane and the other housing surface being an axial abutment surface in a substantially radially extending plane. The ring has a circumferential sealing surface for sealing engagement of the ring with the sloped housing surface, and a planar abutment surface for sealing engagement of the ring with the axial abutment housing surface.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

Figure 1:
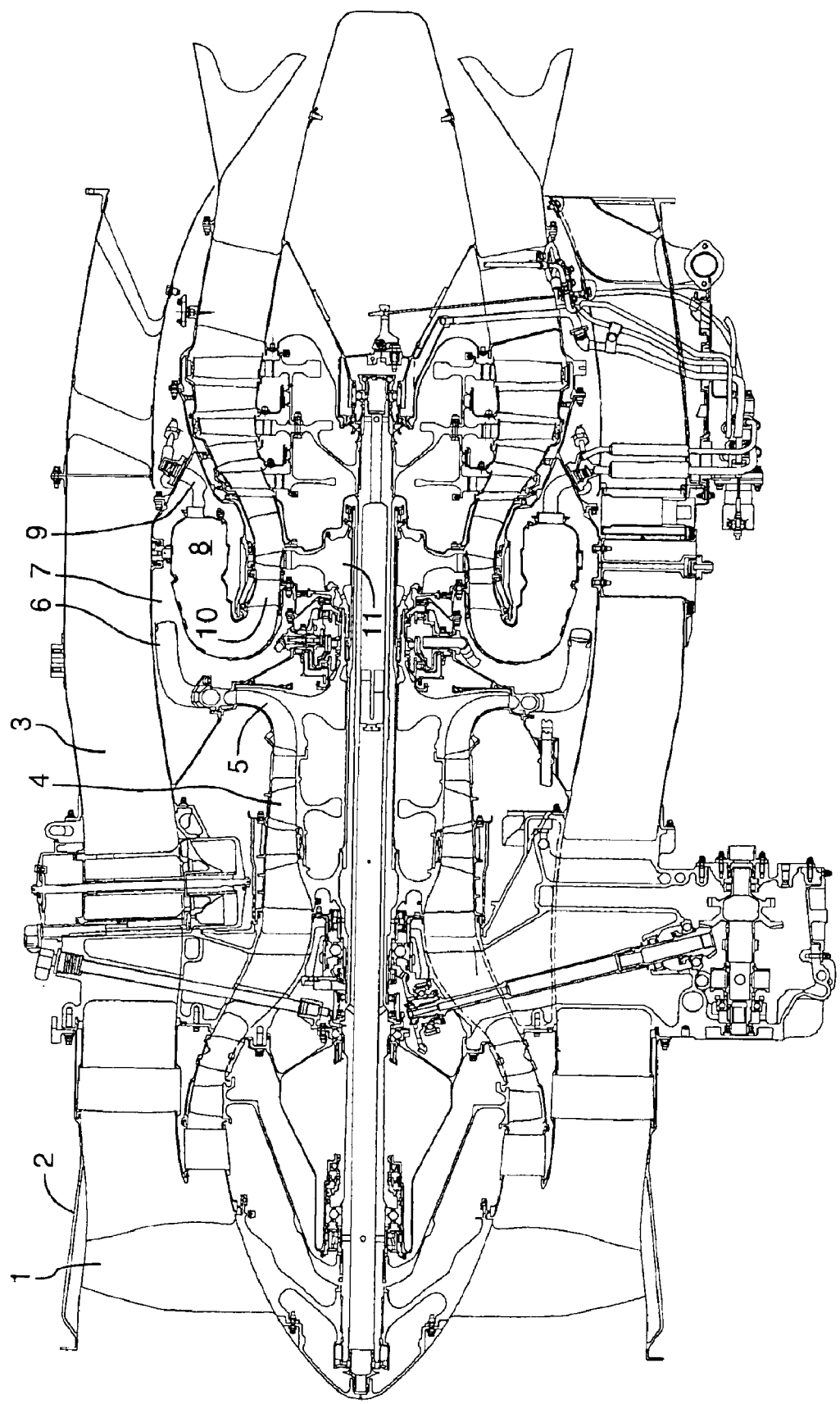
FIG. 1 is an axial cross-section view through a turbofan gas turbine engine showing general layout of the conventional components and in particular showing a vane ring 10 adjacent to the combustor 8 to which the example provided herein is directed.

FIG. 1 shows an axial cross-section through a typical turbofan gas turbine engine. It will be understood however that the invention is equally applicable to any type of engine with a combustor and turbine section such as a turbo shaft, a turboprop, auxiliary power unit, gas turbine engine or industrial gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust. It will be understood that the foregoing description is intended to be exemplary of only one of many possible configurations of an environment or application suitable for incorporation of the present invention.

The embodiments of the invention described herein are in respect of a sealing ring 19 applied to seal the nozzle guide vane 10 with its outer shroud to the surrounding turbine support case. It will be understood however that the invention may be applied to many other areas of the gas turbine engine or any combination of a sloped and an axial abutment surface requiring sealing against a pressure differential, while accommodating thermal expansion and contraction, with simultaneous axial and radial displacements.

Figure 2:
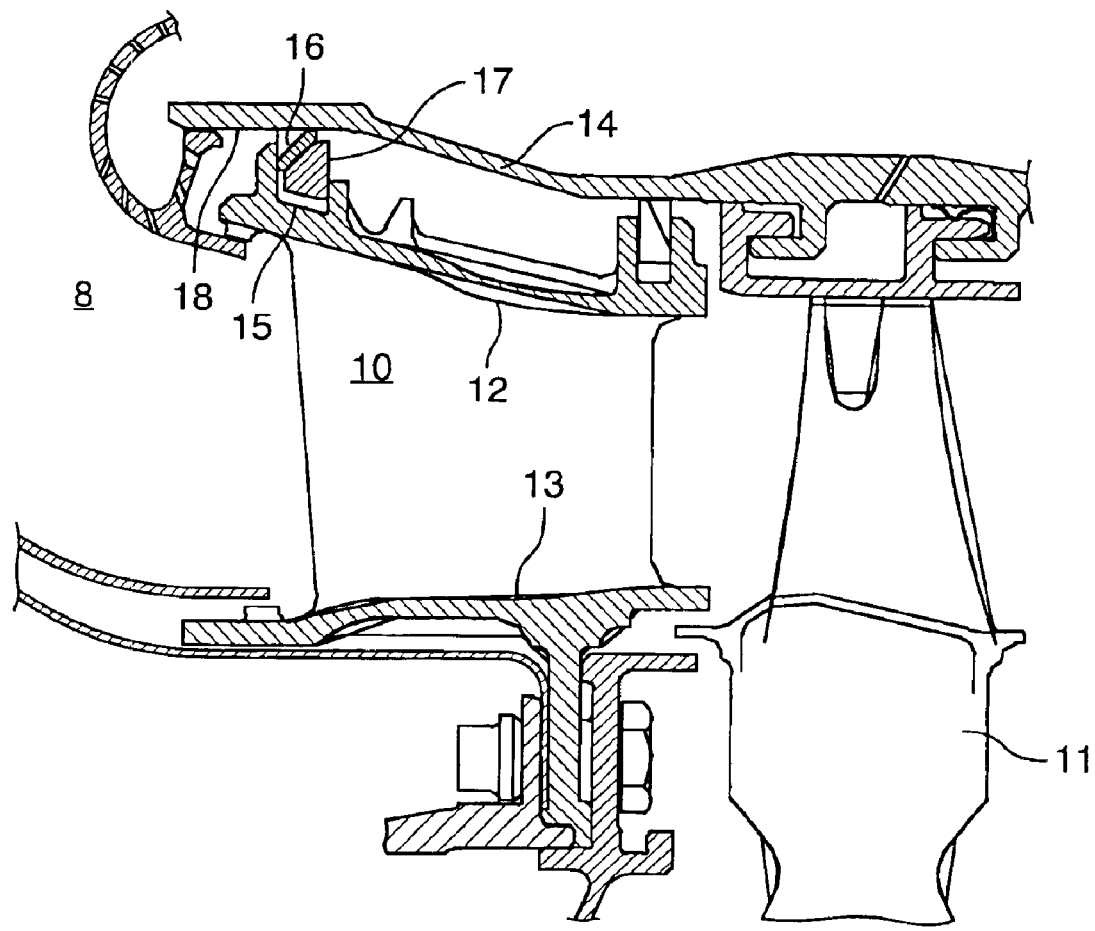
FIG. 2 shows a detailed axial cross-sectional view through the vane ring showing conventional prior art triangular shaped ring with axial and radial sealing surfaces and an energizing ring disposed in a peripheral groove in the vane ring.

FIG. 2 shows the prior art arrangement including the nozzle guide vane 10 which is immediately downstream of the combustor 8. The nozzle guide vane 10 includes an outer shroud 12 and an inner shroud 13 between which the air foil vanes extend to create the vane ring. The outer shroud 12 engages the turbine support case housing 14, which as can be seen in FIG. 1 performs the function of supporting the downstream components.

The outer shroud 12 includes a peripheral groove 15 having an upstream and a downstream axial abutment surfaces between which the sealing ring 16 and the energizing ring 17 are resiliently housed. The conventional sealing ring 16 and the energizing ring 17 seal simultaneously against the upstream axial abutment face of the peripheral groove 15 and the cylindrical inner face 18 of the turbine support case housing 14. The sealing ring 16 simultaneously acts to seal the surface of the peripheral groove 15 and the cylindrical face 18 sealing both axially and radially against pressure differentials while accommodating relative thermal expansion and contraction and any flexural displacement due to the pressure differential. The prior art energizing ring 17 illustrated is resiliently biased radially outwardly causing it to expand and wedge between the downstream radially extending axial abutment face of the groove 15 and push against the conical or hypotenuse inner surface of the sealing ring 16 forcing the sealing ring 16 against the adjacent axial and radially extending mating surfaces.

As well known to those skilled in the art, the area immediately adjacent the combustor 8 and nozzle guide vane 10 experiences dramatic thermal fluctuations, vibration and relative movement between components. During engine overhauls the rings 16 and 17 are often replaced. Since these rings 16 and 17 are often formed by casting in order to provide improved creep properties, the cost of these rings 16 and 17 can be significant.

Figure 3:
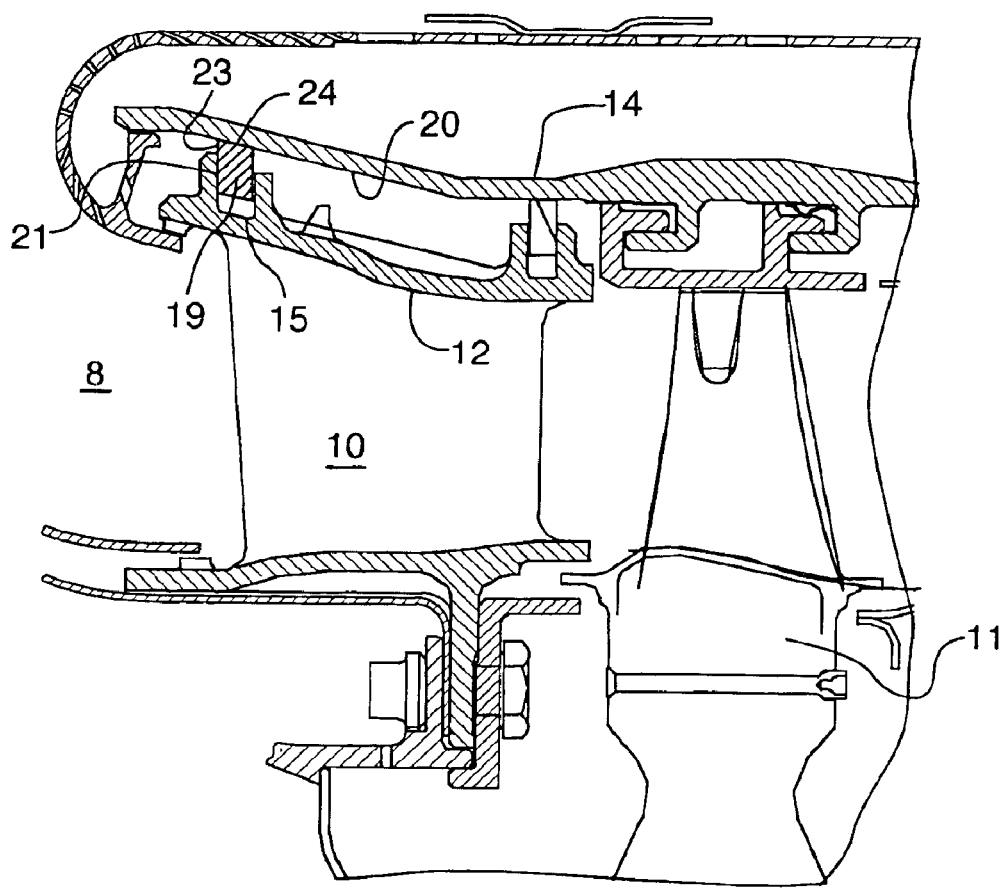
FIG. 3 shows a first embodiment of the sealing ring according to the invention with a sloped profile diametrically energized radially outwardly against a sloped surface of the outer housing and retained within the axially abutting surfaces of a groove in the vane ring.
Figure 6:
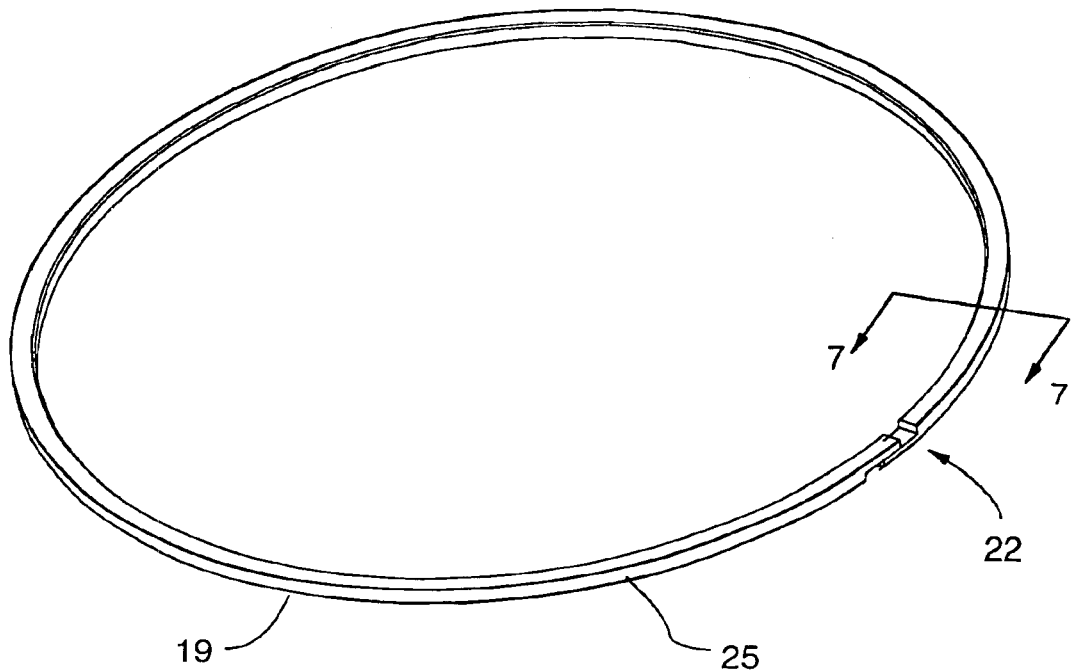
FIG. 6 is an isometric view of the ring of FIG. 4 showing details of the circumferential lap joint.
Figure 7:
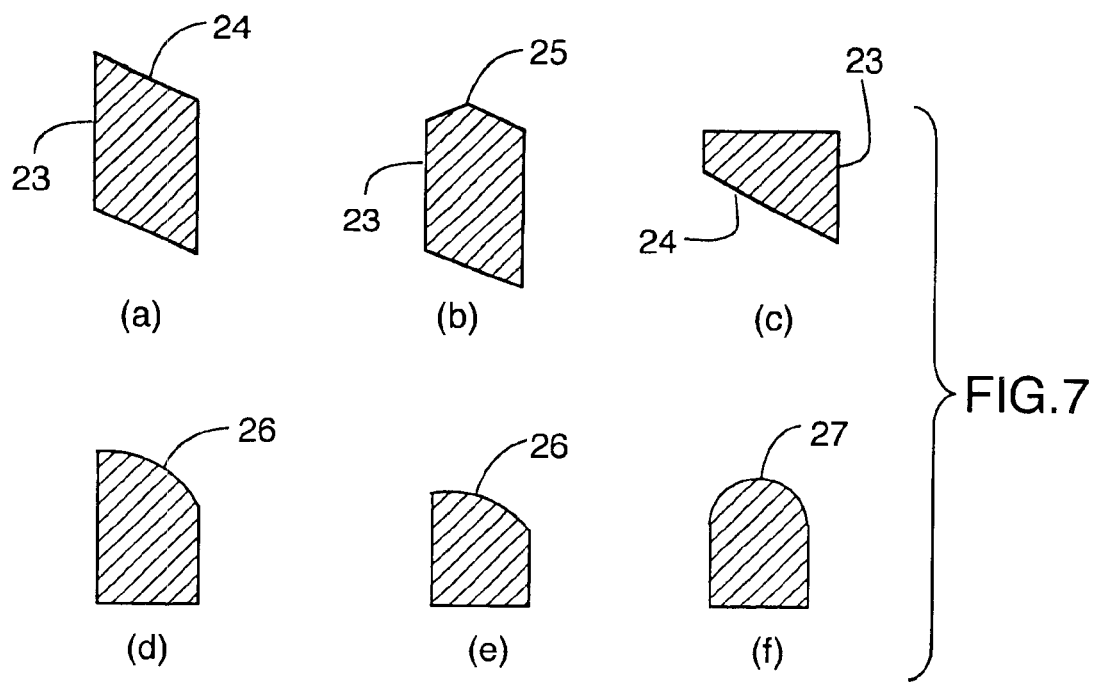
FIGS. 7(a)–(f) show alternative profiles for the ring in sectional views along line 7—7 of FIG. 6.

FIG. 3 shows a first embodiment of the invention which provides a radially energized resilient ring 19 for sealing between a sloped conical inner housing surface of revolution 20 of the turbine support case housing 14 and the coaxial axial abutment housing surface 21 within the peripheral groove 15. The outwardly energized resilient ring 19 has a sloped ring surface 24 that is adapted for sealing engagement with the sloped housing surface 20 and also has an axial abutment ring surface 23 adapted for sealing engagement against the axial abutment housing surface 21. FIG. 6 shows the ring 19 in an isometric view to illustrate details of the lap joint 22 and further shows details of the radially extending axial abutment ring surface 23 and the sloped ring surface 24.

Figure 4:
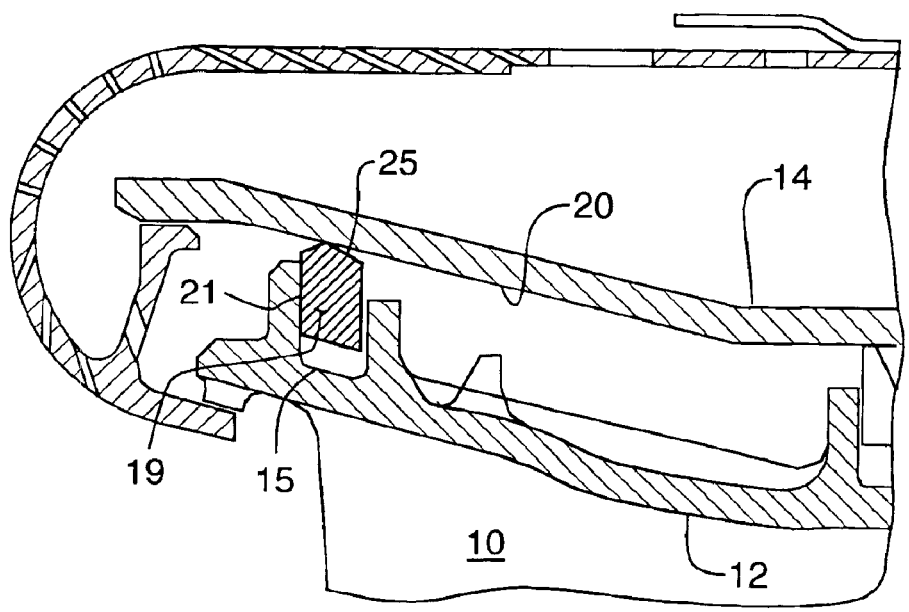
FIG. 4 shows a second embodiment of the sealing ring according to the invention with a cusped or peaked profile diametrically energized radially outwardly against the sloped surface of the outer housing.

As illustrated in FIG. 6, the circumferential expansion lap joint 22 has overlapping surfaces that provide sufficient sealing for resisting pressure differentials while providing the ring 19 with an outwardly directed radially energized resilience that is sufficient to exert pressure against the sloped housing surface 20. Due to the sloped inclined surface 20, interacting with the sloped ring surface 24, an axially directed forward force also develops to exert axial pressure against the radially extending axial abutment housing surface 21. The rings 19 may be constructed as cast or forged metal rings of nickel, for example. Any suitable material and manufacturing method may be used. As shown in FIG. 4, in a second embodiment a cusped sealing surface 25 may be adopted such that a single point of contact along the cusp is provided for sealing. FIGS. 7(a)–(d) also shows variations in the shape of the sloped sealing surface including a conical surface 24, a cusped surface 25, a curved surface 26 and an arcuate surface 27.

Figure 5:
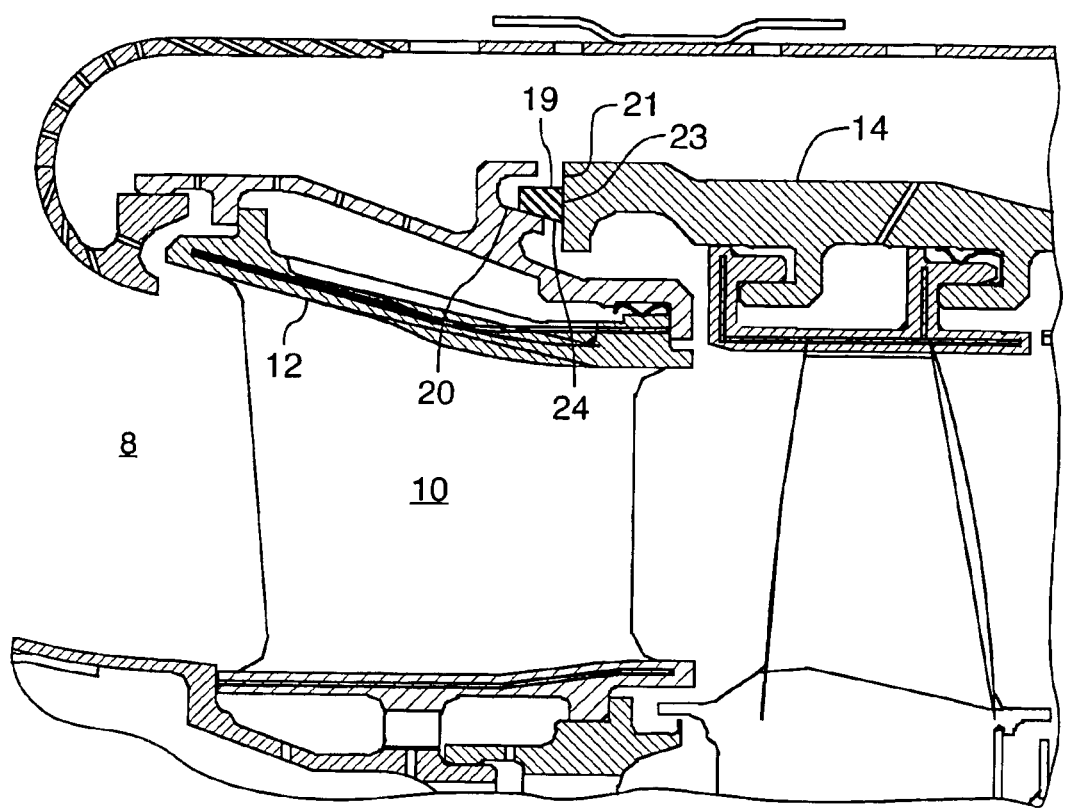
FIG. 5 is an axial cross-sectional view showing a third embodiment of the invention with a sloped conical sealing profile energized diametrically radially inwardly to seal against a sloped conical surface of the housing and an axial surface simultaneously.

FIG. 5 shows an alternate third embodiment where the resilient ring 19 is radially energized to exert a radially inward force against the sloped housing surface 20 with the sloped ring surface 24. As a result of the interaction between the sloped surfaces 20 and 24 an axially directed force is developed and the radially extending axial abutment ring surface 23 exerts an axially rearward pressure against the axial abutment housing surface 21.

FIG. 6 shows a circumferentially sliding lap joint 22. However other expansion joints are equally applicable such as a circumferentially sliding beveled joint (not shown).

Therefore, the invention provides the advantage of a single diametrically energized piston ring 19 that can be used to replace the relatively complex sealing ring 16 and energizing ring 17 of the prior art shown in FIG. 2. Further, the rings 19 of the invention can be used to seal any static component provided one has a sloped surface and the other has a radially extending axial abutment face as illustrated in the example shown in FIGS. 3–5. The single ring 19 can accommodate axial and radial movement between the components and maintain a seal between two adjacent cavities or plenums across a pressure differential.

Although the above description relates to specific preferred embodiments as presently contemplated by the inventor, it will be understood that the invention in its broad aspect includes mechanical and functional equivalents of the elements described herein.

I claim:

1. A resilient ring for sealing between an inner housing surface of revolution and a coaxial outer housing surface of revolution, one of said housing surfaces being a sloped surface with a sloped profile intersecting an axially extending plane and the other housing surface being an axial abutment surface disposed in a substantially radially extending plane, the ring having:

a circumferential sealing surface adapted for sealing engagement of the ring with the sloped housing surface; and a planar abutment surface adapted for sealing engagement of the ring with the axial abutment housing surface.

2. A ring according to claim 1 wherein the circumferential sealing surface has a circumferential sealing surface profile intersecting an axially extending plane selected from the group consisting of: a sloped profile; a conical profile; a cusped profile; a curved profile; and an arcuate profile.

3. A ring according to claim 1 including a circumferential expansion joint.

4. A ring according to claim 3 including a circumferentially sliding lap joint.

5. A ring according to claim 3 including a circumferentially sliding bevel joint.

6. A gas turbine engine having an inner housing surface of revolution and a coaxial outer housing surface of revolution, one of said housing surfaces being a sloped surface with a sloped profile intersecting an axially extending plane and the other housing surface being an axial abutment surface disposed in a substantially radially extending plane, the ring having:

a circumferential sealing surface adapted for sealing engagement of the ring with the sloped housing surface; and a planar abutment surface adapted for sealing engagement of the ring with the axial abutment housing surface.

7. A gas turbine engine according to claim 6 wherein the circumferential sealing surface has a circumferential sealing surface profile intersecting an axially extending plane selected from the group consisting of: a sloped profile; a conical profile; a cusped profile; a curved profile; and an arcuate profile.

8. A gas turbine engine according to claim 6 wherein the ring includes a circumferential expansion joint.

9. A gas turbine engine according to claim 8 wherein the ring includes a circumferentially sliding lap joint.

10. A gas turbine engine according to claim 8 wherein the ring includes a circumferentially sliding bevel joint.

11. A method of sealing between an inner housing surface of revolution and a coaxial outer housing surface of revolution, one of said housing surfaces being a sloped surface with a sloped profile intersecting an axially extending plane and the other housing surface being an axial abutment surface disposed in a substantially radially extending plane, the method comprising:

installing a diametrically energized resilient ring having a circumferential sealing surface in sealing engagement with the sloped housing surface and a planar abutment surface in sealing engagement of the ring with the axial abutment housing surface.

12. A method according to claim 11, wherein the circumferential sealing surface has a circumferential sealing surface profile intersecting an axially extending plane selected from the group consisting of: a sloped profile; a conical profile; a cusped profile; a curved profile; and an arcuate profile.

13. A method according to claim 11 wherein the ring includes a circumferential expansion joint.

14. A method according to claim 13 wherein the ring includes a circumferentially sliding lap joint.

15. A method according to claim 13 wherein the ring includes a circumferentially sliding bevel joint.

* * * * *